Jan. 31, 1961  B. TERLECKY  2,969,752
CAR CONSTRUCTION
Filed Nov. 28, 1956  2 Sheets-Sheet 1

INVENTOR.
BORIS TERLECKY
BY
Robert A. Shields
ATTORNEY

Jan. 31, 1961   B. TERLECKY   2,969,752
CAR CONSTRUCTION
Filed Nov. 28, 1956   2 Sheets-Sheet 2
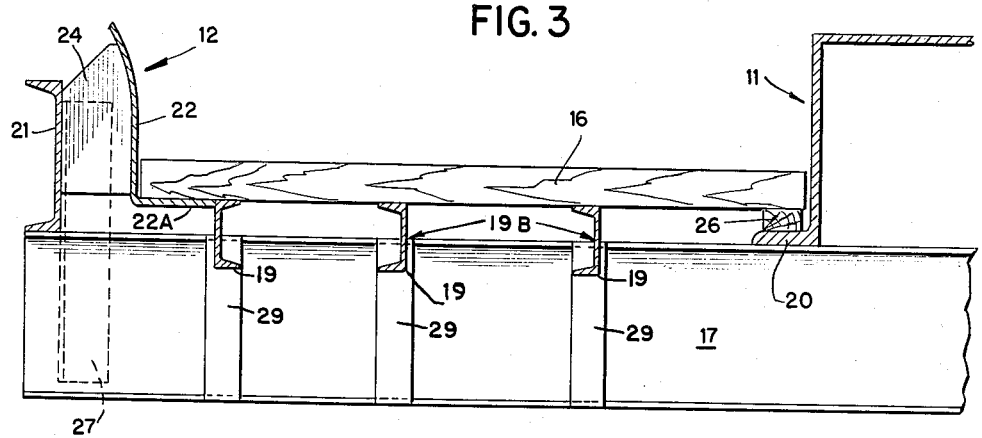
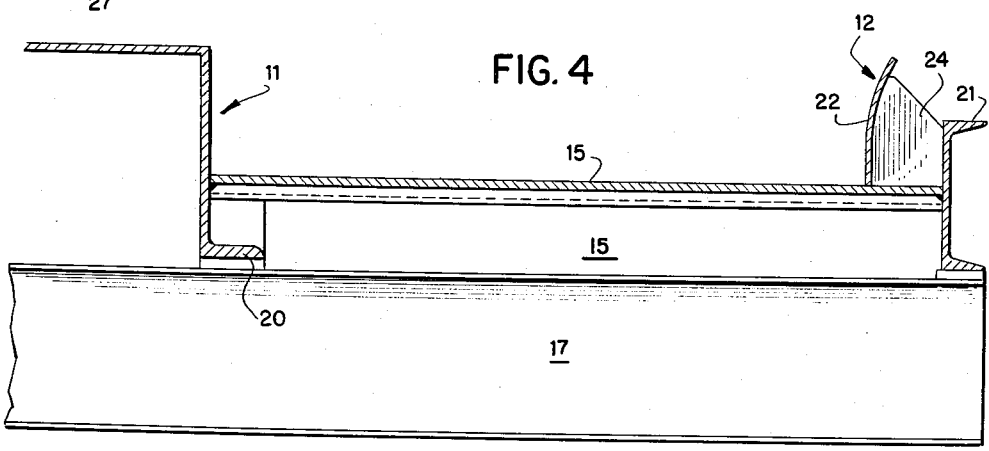
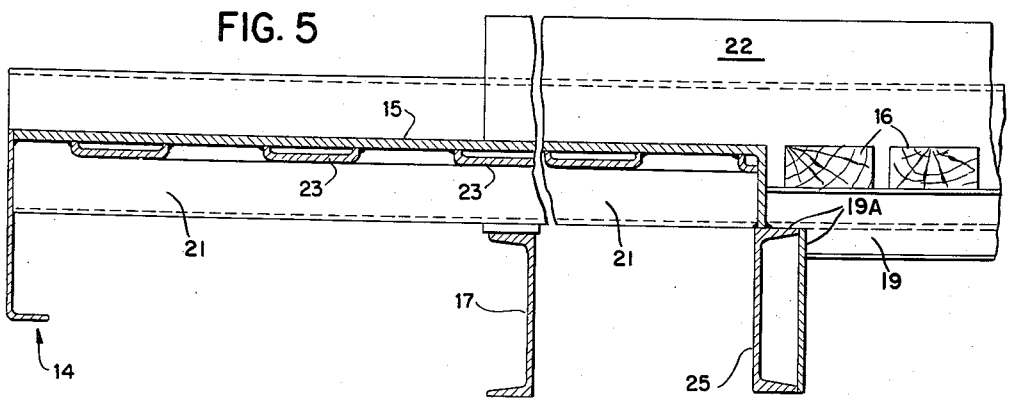
INVENTOR.
BORIS TERLECKY
BY
Robert A. Shield
ATTORNEY United States Patent Office 2,969,752
Patented Jan. 31, 1961

2,969,752

CAR CONSTRUCTION

Boris Terlecky, New York, N.Y., assignor to ACF Industries, Incorporated, New York, N.Y., a corporation of New Jersey Filed Nov. 28, 1956, Ser. No. 624,903

11 Claims. (Cl. 105—418)

This invention relates to railway car construction, and, more particularly, to a novel side sill and flat car construction made possible thereby.

Heretofore, the use of flat cars for the transportation of highway vehicle trailers has been well known and has recently come into favor with many railroads. However, one disadvantage associated with such usage is that the overall height of large trailers and flat cars renders certain rail routes involving low head room tunnels, for example, unavailable for such service. It will be readily appreciated that the elimination of such a condition would considerably reduce the time and expense involved in rerouting, and would greatly facilitate trailer on freight car service.

Accordingly, it is an object of the present invention to provide a car construction whereby the foregoing disadvantages and difficulties will be eliminated.

Another object is to provide a novel side sill whereby a flat car suitable for trailer transport will be made possible.

Another object is to provide such a side sill whereby the floor of the flat car will be appreciably lower than those of conventional flat cars.

A further object is to provide a side sill which extends above the floor level to serve as a safety curb for trailers and as an anchor for lashing hooks.

A still further object is to provide a car construction made possible by a novel side sill which construction is relatively light in weight, rugged and simple in construction and economical to manufacture.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing in a railway car body construction, the combination of a pair of side sills extending longitudinally of the car, a center sill intermediate the side sills and provided at each side thereof with supporting means, and flooring means having outer ends mounted on the side sills at the lower portion thereof and inner ends mounted on the supporting means. A plurality of spaced cross tie members are secured to the under surfaces of the center and side sills to tie them together and rigidify the underframe.

The foregoing construction is facilitated by the novelty of the side sills employed therein which sills comprise an outer sill member extending longitudinally of the car body, an inner sill member spaced from the outer sill member and likewise extending longitudinally of the car body and provided with floor supporting means at the lowermost portion thereof, and vertically and laterally extending buttress means connecting the sill members. The floor supporting means of the novel side sill is located in a lowered position substantially in a line with the supporting means of the center sill. The center sill is normally disposed at standard height but with its floor supporting means positioned at the lowest portions thereof.

A preferred embodiment of the invention has been chosen for purposes of illustration and description, and is shown in the accompanying drawing, forming a part of the specification, wherein:

Fig. 3 is a fragmentary cross sectional view taken along the line 3—3 of Fig. 2;

Fig. 4 is a fragmentary cross sectional view similar to that of Fig. 3 and taken along the line 4—4 of Fig. 2; and Fig. 5 is a fragmentary cross sectional view taken along the line 5—5 of Fig. 1.

Figure 1:
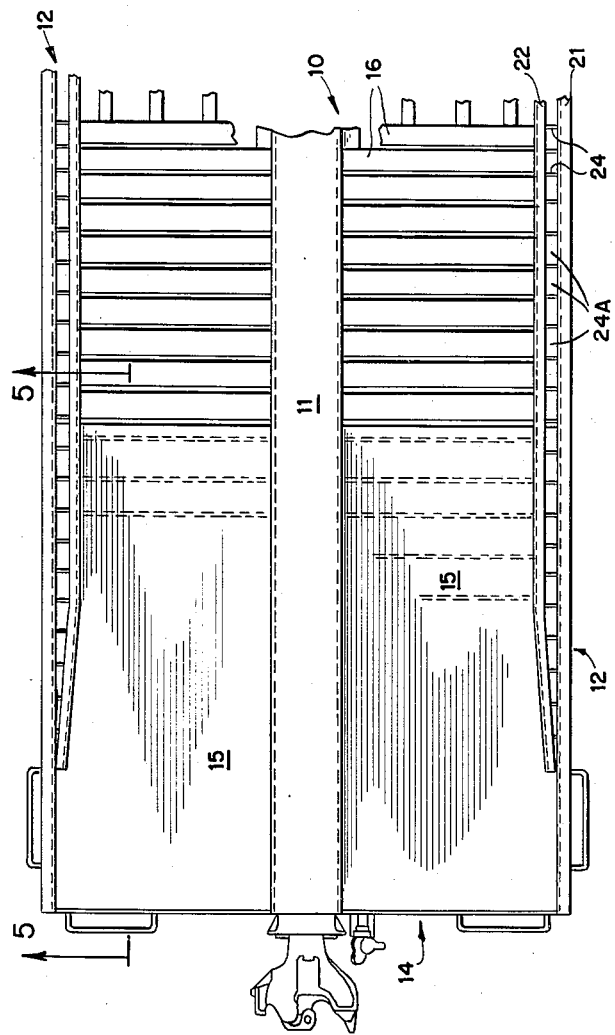
Fig. 1 is a fragmentary top plan view of a railway car constructed in accordance with the teachings of the present invention.

Referring to the drawing in detail, and more particularly to Fig. 1 thereof, there is shown a flat car 10 of a type intended for trailer on flat car service. The car 10 is provided with a center sill 11, extending longitudinally along the car center, side sills 12 extending longitudinally of the car and defining the sides thereof, end sills 14 extending transversely of the car at the ends thereof and connecting the ends of the center sill and the side sills, and floor plates 15 at the end zones of the car adjacent the trucks and floor boards 16 at the central zone of the car, arranged to constitute the car deck as will subsequently be described.

As shown in Figs. 2 to 5, a plurality of spaced cross ties 17 having substantially flat, continuous upper surfaces throughout their length are provided extending transversely of the car and secured to the under surfaces of the center and side sills. Longitudinal, spaced, floor supporting stringers 19 are in turn supported by the cross ties.

Figs. 1, 3 and 4 best illustrate the center sill 11 and it will be seen that this member is an inverted U beam normally disposed at standard height along the longitudinal and vertical center line of the car and in the embodiment shown extending continuously for the length of the car. The lower ends of the vertical arms of this member are formed with integral, outwardly extending flanges 20 which constitutes supporting means for the inner ends of the floor plates 15 and boards 16.

The side sills 12 are identical so that only one will be described. A side sill of the type contemplated herein includes an outer sill member 21 consisting of an outwardly opening C beam or channel extending the full length of the car body and defining the sides thereof, an inner sill member 22 extending lengthwise of the car body but spaced inwardly of the outer member 21. This inner member is generally L-shaped in cross section at the central zone of the car body, the horizontal leg 22A thereof constituting a bottom flange of sill 12 and extending inwardly towards the center sill 11; and is merely an upwardly and outwardly curved plate at the end or terminal zones of the car body, for a purpose to be discussed. The bottom flange of the side sill is in a lowered position relative to floor supporting means in flat cars used before the present invention and is substantially in line with the outwardly extending flanges at the lower ends of the center sill 11. The upper portion of the vertical leg of the inner member is curved slightly outwardly. This inner member does not extend all the way to the car ends, but, as shown in Fig. 1, is bent outwardly near its ends so as to terminate adjacent the outer member 21 slightly inwardly of the car ends.

The inner and outer side sill members are secured together along their opposing vertical surfaces by a plurality of spaced, transversely and vertically extending buttress plates 24 which serve to rigidify the sill and to maintain proper spacing between the longitudinal sill members. A multiplicity of upwardly and outwardly open pockets 24A is thus formed, constituting keepers or anchors for hooks of cargo lashing ropes or chains. The upward and outward curve of member 22 and the corners formed by said member with the plates 24 is ideal for quickly and securely engaging a cargo hook.

Figure 2:
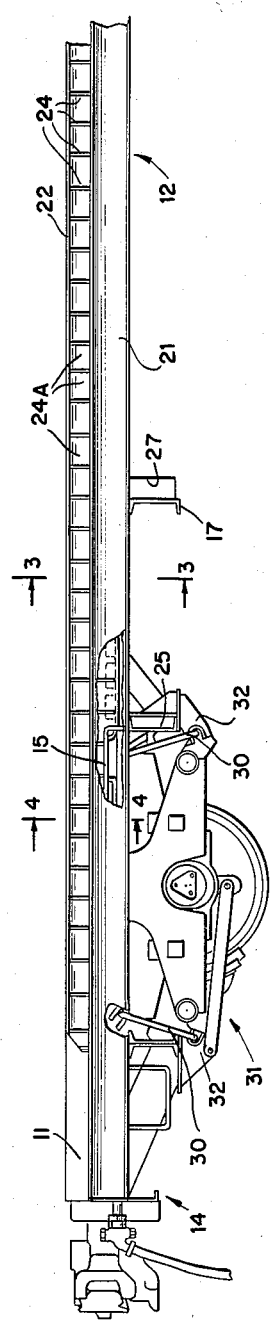
Fig. 2 is a fragmentary side elevational view of the car shown in Fig. 1.

As shown in Figs. 1, 2 and 5, the end sills 14 are merely L beams extending transversely of the car body at its ends and secured, as by welding, to the respective ends of the side and center sills.

As has been mentioned heretofore, the car deck is composed of floor plates 15 at the end zones thereof, and floor boards 16 at the central zone thereof.

As shown in Figs. 1, 4 and 5, the floor plates 15 are metal plates welded along their outer ends to the end sill 14, along their inner sides to a vertical leg of the center sill 11, and along their outer sides to the inner surface of the outer side sill member 21. At their inner ends the plates 15 are bent downwardly and welded to a transverse cross tie 25 in the form of a box beam. As has been stated, the innerside sill member 22 is merely an upwardly extending plate at the end zones of the car body, the horizontal leg 22A of the inner member terminating at the ends of the central zone. This construction enables the floor plates to extend outwardly to the outer sill members, as shown in Fig. 4, and to be welded to the lower ends of the inner sills and buttress plates. The floor plates are rigidified by a series of spaced, transversely extending U plates 23 welded along their sides to the under surface of the floor plates and at their ends to the center and side sills.

The floor boards 16 are employed at the central zone of the car body and are secured in a conventional manner at their outer ends to the upper surfaces of the horizontal legs or bottom flanges 22A of the inner side sill members 22, and at their inner ends they are supported on the center sill supporting means or flanges 20 which may carry a longitudinal spacer 26 to insure proper floor alignment.

With the exception of the box beams 25 located below and supporting the inner transverse ends of floor plates 15, the cross ties 17 are spaced, transversely extending C beams or channels, to the upper flanges of which are welded the bottom flanges of the outer side sill members 21 and the center sill flanges 20. Reinforcement is provided between the cross ties and side sills by vertical posts 27 welded to both members, as shown in Fig. 3. The cross tie flanges are connected at spaced intervals by narrow plates 29 which serve as standards for supporting the longitudinal stringers 19 shown here as channels and which extend under the central zone of the car body between the box beams 25, crossing at least two channel cross ties.

It will be noted that the side sills and the center sill provide floor supporting means at the lower portions thereof and that they extend upwardly above the level of the car floor so that the same is centrally divided by the center sill to provide a pair of low level curbed, vehicle treadways.

It will also be noted that the floor stringers 19 are notched, as at 19A in Fig. 5, to receive the box beams 25 at their ends. The cross ties 17 are similarly accommodated intermediate the stringer ends, as indicated in Fig. 3 at 19B, thereby permitting the use of stringers of substantial size and strength and, at the same time, maintaining the low level vehicle treadways.

As shown in Fig. 2, the car body is suspended by hangers 30 from the trucks 31 by employing the end pairs of cross ties to support the body hanger brackets 32.

When a highway vehicle is to be transported by rail, it is loaded onto a car of the indicated construction and anchored thereon in any suitable manner with the wheels thereof resting upon the metal floor plates 15. The low car floor enables trailers to be transported by rail through a number of tunnels which were heretofore of insufficient head room.

From the foregoing description it will be seen that the present invention provides a car construction having a novel side sill which construction is relatively light in weight, rugged and simple in construction, and economical to manufacture. It will also be seen that the present invention provides a flat car for trailer transport wherein the floor is lower by as much as ten inches than those of conventional flat cars, and wherein safety curbs are formed integral with the car underframe. As clearly seen in Figures 3 and 4, the top surfaces of the floor plates 15 and floor boards 16, which two elements constitute the entire flooring means of the car and extend throughout the length of the car, are substantially below midheight of the center sill 11, and are at about midheight of the car coupler, as seen in Figure 2.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. In a railway car body construction, a longitudinally extending center sill having an outwardly extending flange at the lowermost portion thereof, said outwardly extending flange extending longitudinally substantially the length of said center sill, a side sill comprising an outer sill member having a top edge and extending longitudinally of the car body, an inner sill member transversely spaced from said outer sill member and likewise having a top edge and extending longitudinally of the car body and provided with floor supporting means at the lowermost portion thereof extending in a lowered plane substantially in line with said flange of said center sill, and buttress means connecting said sill members along their opposing vertical surfaces and maintaining said members and said top edges in spaced relation.

2. In a railway car body construction, a longitudinally extending center sill having an outwardly extending flange at the lowermost portion thereof, said outwardly extending flange extending longitudinally substantially the length of said center sill, a side sill comprising an outer sill member having a top edge and extending longitudinally of the car body, a generally L-shaped plate member transversely spaced from said outer sill member and likewise having a top edge and extending longitudinally of the car body, the horizontal leg of said L-shaped member serving as a support for flooring means, said horizontal leg support extending in a lowered plane substantially in line with said flange of said center sill and a plurality of transversely and vertically extending spaced buttress plates connecting said outer sill member and said L-shaped member along their opposing vertical surfaces and maintaining said members and said top edges in spaced relation.

3. In a railway car body construction, a side sill according to claim 2, wherein the upper portion of the vertical leg of said L-shaped member is curved outwardly and said top edge thereof overlies said buttress plates.

4. In a railway car body construction, in combination, a center sill and two side sills, said center sill being normally disposed at standard height along the longitudinal and vertical center lines of said car, all of said sills extending for the full length of the car body, a multiplicity of cross tie members having substantially flat, continuous upper surfaces throughout their length, said cross tie members being secured to the under surfaces of said center and side sills, and flooring means extending the full length of said car body and supported on said sills adjacent said cross tie members and on said cross tie members and having an upper surface, said upper surface being below midheight of said center sill.

5. In a railway car body construction, in combination, a center sill and two side sills, said center sill being normally disposed at standard height along the longitudinal and vertical center lines of said car, all of said sills extending for the full length of the car body, a multiplicity of cross tie members having substantially flat, continuous upper surfaces throughout their length, said cross tie members being secured to the under surfaces of said center and side sills, and flooring means extending the full length of said car body and supported on said sills adjacent said cross tie members and, on said cross tie members and having an upper surface, said car body further having a car coupler operatively connected to said sills, said upper surface of said flooring means being substantially at midheight of said coupler.

6. In a railway car body construction, in combination, a center sill and two side sills, said center sill being normally disposed at standard height along the longitudinal and vertical center lines of said car, all of said sills extending for the full length of the car body, a multiplicity of cross tie members having substantially flat, continuous upper surfaces throughout their length, said cross tie members being secured to the under surfaces of said center and side sills, and flooring means extending the full length of said car body and supported on said sills adjacent said cross tie members and on said cross tie members and having an upper surface, said upper surface being below the top surface of said center sill.

7. In a railway car body construction, a center sill normally disposed at standard height and having an outwardly extending flange at the lowermost portion thereof, said outwardly extending flange extending longitudinally substantially the length of said center sill, a side sill comprising an outer sill member having a top edge and extending the full length of the car body, an inner sill member having a top edge and being generally L-shaped at the central zone of the car body and being reduced to an upwardly extending plate at the end zones of the car body, a plurality of spaced vertically and laterally extending buttress plates connecting said outer and said inner sill members along their opposing vertical surfaces and maintaining said members and said top edges in spaced relation, a horizontal metal floor plate extending in an end zone of said car from the lower portion of said center sill to said outer sill member and further being in underlying contact with said inner sill member and with a plurality of said buttress plates and firmly connected to said center sill, to said inner and outer sill members and to said buttress plates and flooring means extending in the central zone of the car and supported along the lowermost portions of said L-shaped inner sill member and said center sill.

8. In a railway car body construction, the combination of a side sill extending longitudinally of said car, an inwardly extending flange provided by said side sill at the lowermost portion thereof, a center sill normally disposed at standard height transversely spaced from said side sill, an outwardly extending bottom flange provided by said center sill at the lowermost portion thereof and extending substantially from end to end thereof, said inwardly extending bottom flange of said side sill extending throughout its length in a lowered plane substantially in line with said outwardly extending bottom flange of said center sill, flooring means having outer and inner ends supported by said inwardly and said outwardly extending flanges, respectively, and a plurality of longitudinally spaced cross tie members, said cross tie members having top surfaces, said top surfaces of said cross tie members being secured to the undersurfaces of said sills.

9. In a railway car body construction, the combination of a side sill extending longitudinally of said car, an inwardly extending flange provided by said side sill, an inverted U beam center sill normally disposed at standard height and extending longitudinally of said car, an outwardly extending flange provided by said center sill at the lowermost portion thereof and extending longitudinally substantially from end to end thereof, said inwardly extending flange of said side sill extending throughout its length in a lowered plane substantially in line with said outwardly extending flange of said inverted U beam, and flooring means supported at its ends by said inwardly and said outwardly extending flanges.

10. In a railway car body construction, the combination according to claim 9, wherein said flooring means has an upper surface extending the length of said car and said inverted U beam extends upwardly to a level above the upper surface of said flooring means throughout the length thereof.

11. In a railway car body construction, the combination of a plurality of longitudinally spaced cross ties having substantially flat continuous top surfaces throughout their length, a center sill normally disposed at standard height mounted on top of said cross ties between the ends thereof, outwardly extending bottom flanges provided by said center sill at the lowermost portion thereof at each side thereof and extending substantially from end to end thereof, a pair of longitudinally extending side sills mounted on top of said cross ties at the ends thereof, inwardly extending bottom flanges provided by said side sills at the lowermost portions thereof and extending in a lowered plane substantially in line with said bottom flanges of said center sill, flooring means extending longitudinally of said car between said center sill and said side sills, said flooring means having an upper surface and ends, said flooring means being supported at said ends by said inwardly and outwardly extending flanges, said upper surface of said flooring means being below midheight of said center sill substantially throughout its entire length.

References Cited in the file of this patent
UNITED STATES PATENTS

| | | |
|---|---|---|
| 727,488 | Swanson | May 5, 1903 |
| 809,734 | Ostrander | Jan. 9, 1906 |
| 832,623 | Prouty | Oct. 9, 1906 |
| 839,952 | Pflager | Jan. 1, 1907 |
| 899,651 | Becker | Sept. 29, 1908 |
| 2,001,935 | Otis | May 21, 1935 |
| 2,587,754 | Osborn | Mar. 4, 1952 |
| 2,669,193 | Osborn | Feb. 16, 1954 |
| 2,851,963 | Sheehan | Sept. 16, 1958 |

OTHER REFERENCES

"Modern Railroads," October 1953, pp. 46–47, 105/159 (copy in Scientific Library, photostat copy in Div. 34).